(12) United States Patent
Dustin et al.

(10) Patent No.: US 6,496,857 B1
(45) Date of Patent: Dec. 17, 2002

(54) DELIVERING TARGETED, ENHANCED ADVERTISEMENTS ACROSS ELECTRONIC NETWORKS

(75) Inventors: Jim Dustin, Fruitland Park, FL (US); Scott Fertig, Stony Creek, CT (US); Lawrence Lee, New Haven, CT (US)

(73) Assignee: Mirror Worlds Technologies, Inc., New Haven, CT (US)

( * ) Notice: Subject to any disclaimer, the term of this patent is extended or adjusted under 35 U.S.C. 154(b) by 0 days.

(21) Appl. No.: 09/499,996

(22) Filed: Feb. 8, 2000

(51) Int. Cl.[7] .............................................. G06F 13/00
(52) U.S. Cl. ........................ 709/219; 709/225; 709/329
(58) Field of Search ................................ 709/203, 217, 709/219, 223, 224, 225, 328, 329

(56) References Cited

U.S. PATENT DOCUMENTS

| | | |
|---|---|---|
| 5,855,008 A | 12/1998 | Goldhaber et al. |
| 5,948,061 A | 9/1999 | Merriman et al. |
| 5,959,623 A | 9/1999 | van Hoff et al. |
| 6,009,410 A | 12/1999 | LeMole et al. |
| 6,011,537 A | 1/2000 | Slotznick |
| 6,188,398 B1 * | 2/2001 | Collins-Rector et al. .... 345/327 |

OTHER PUBLICATIONS

Download dated Jan. 19, 2000, http://www.clicvu.com/partners.cfm.
Download dated Jan. 19, 2000, http://www.clicvu.com/company.cfm.
Download dated Jan. 19, 2000, http://www.clicvu.com/support/default.cfm.
Download dated Jan. 19, 2000, http://www.clicvu.com/support/faq.cfm.
Download dated Jan. 19, 2000, http://www.clicvu.com/support/howitworks.cfm.
Download dated Jan. 19, 2000, http://www.forbes.com/tool/html/99/dec/1210/feat.htm.

* cited by examiner

*Primary Examiner*—Viet Vu
(74) *Attorney, Agent, or Firm*—Cooper & Dunham LLP

(57) ABSTRACT

A system in which an Internet user can designate Internet ads for later use, in response to which enhanced versions of the ads are stored in a user-associated area in a server, without interrupting the user's current activity. In another embodiment, the system delivers enhanced versions of the ads automatically and transparently to a user-associated area in a server for storage. When at a later time the user requests access to the previously stored ads, the system delivers to the user's Internet-enabled device a presentation of thumbnails of the enhanced ad versions. These thumbnails can be in the form of static images, sound or video clips, or interactive rich media. The user reviews the thumbnail presentation and upon user selection of a particular ad, the enhanced version of the ad is delivered to the user's display or other Internet-enabled device interface for appropriate user action.

12 Claims, 7 Drawing Sheets

List format

Grid format

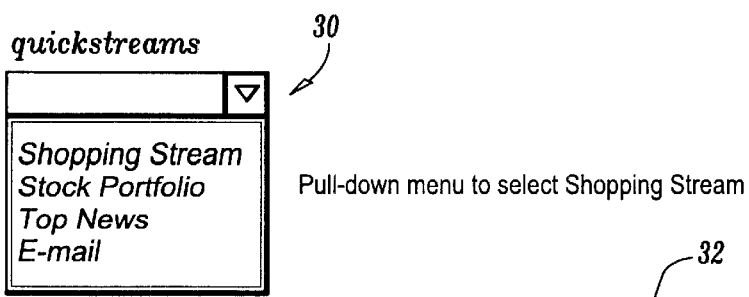
FIG. 4-1  Pull-down menu to select Shopping Stream
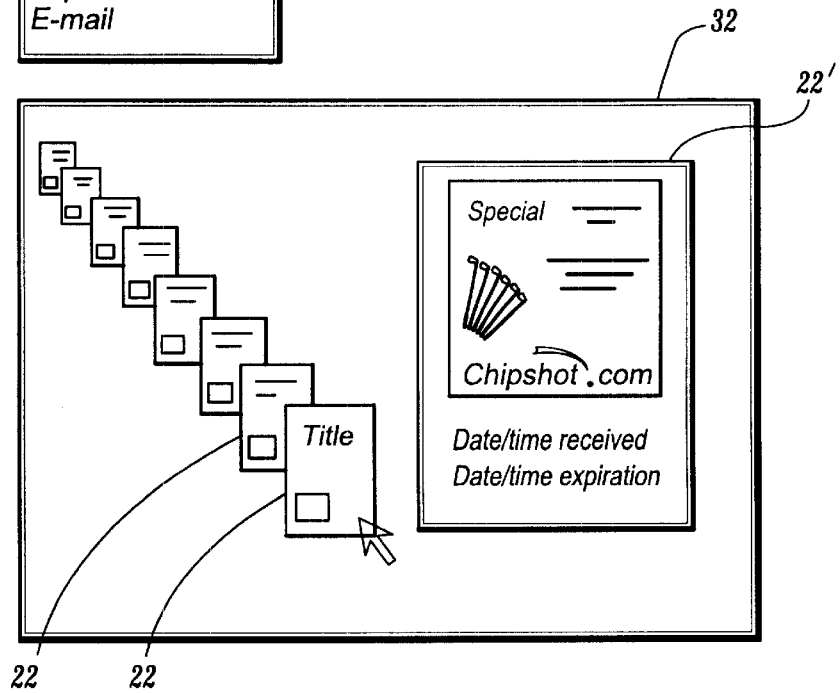
FIG. 4-2  Sample screen shot of stream of enhanced ads. Mouse over first ad brings up glance view of ad with thumbnail.
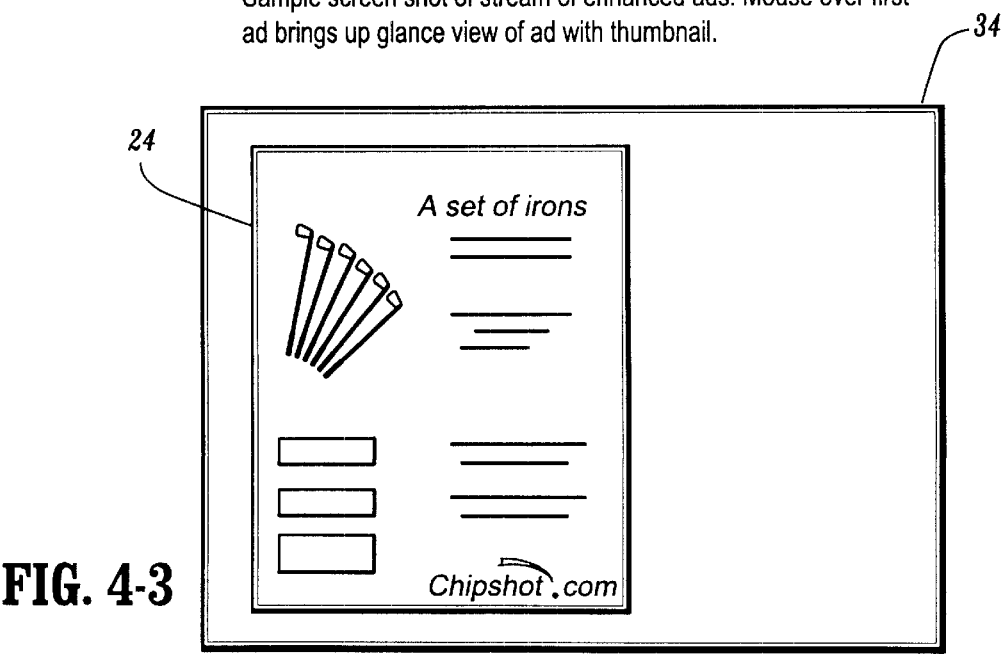
FIG. 4-3  Sample screen shot of full version of ad.

DELIVERING TARGETED, ENHANCED ADVERTISEMENTS ACROSS ELECTRONIC NETWORKS

FIELD

This patent specification is in the field of network communication and more specifically in the field of targeting ads and similar material.

BACKGROUND

Many ads such as banner ads that appear on Internet websites are not targeted to a particular user or even classes of users although it has long been believed that ads targeted as specifically as practical to a particular user are more effective. Such targeting can be based on demographics, some history of an individual, and/or other factors. One proposal for targeting ads is the Double Click system discussed in U.S. Pat. No. 5,948,061 and involves compiling information on individuals based on their use of networks such as the Internet. This can create privacy issues where participation is often not disclosed and, in any event, relies on the assumption that past behavior of an individual as reflected in Internet use is a valid predictor of current or future interests of the same individual, as well as the assumption that an individual using a computer currently is the same individual who created the historical data. Another approach is to encourage users to view banner ads by making it possible to click on them and store them in a personal archive for viewing at a later, more convenient time. This approach is illustrated at a website http://www.clicvu.com. According to this ClicVu website, when a user clicks on a banner ad, ClicVu displays a box containing several buttons. Clicking on a "Go Now" button immediately transfers the user to the advertiser, s website. Clicking on a "Go Later" button stores the banner ad so the user can view it at a later, more convenient time. Clicking on a "Vu Ads" button recalls previously stored banner ads for the user. Clicking on a stored (and recalled) banner ad sends the user to the advertiser's website. Another proposal, which may not be specific to ads, is discussed in an article "Will backflip flop" by Panelope Patsuris found at http://www.forbes.com/tool/htms=I/99dec/1210/feat.htm. According to the article, clicking on a toolbar button of a web browser launches a BackFlip box, and one or two clicks in a pop-up window stores a page in a personal directory on a BackFlip site that the user can access from any computer with a password. The article states that the BackFlip group had a product in beta testing by the end of October 1999. The ClicVu and Back-Flip proposals are not admitted to be prior art against this patent specification.

In view of the known state of the art, it is believed that a need remains to make advertising on networks such as the Internet more convenient, more relevant, and less intrusive for the user, more effective for the advertiser, and more practical for the content provider. The system disclosed below is directed to meeting these and other needs.

The term advertiser refers here to the party advertising a product, service, event, or something else. Typically, the advertiser pays for the ad. The term content publisher refers here to the party publishing the website in which the ad is placed. The term user refers here to the party accessing the website and viewing or listening to the ad.

SUMMARY

In the preferred embodiments disclosed here, a user who has some interest in the subject matter of a banner ad but does not want to interrupt the current activity to pursue that interest at this time, can click on or otherwise activate a special area of a banner ad and go on with the current activity without being transported to the advertiser's site. At a later time, not necessarily in the current session of using the computer or Internet-enabled device, the user can recall thumbnail versions of the previously activated ads, or lists or other presentations of the ads, in a format that makes it particularly convenient to review, sort them in various ways, and review not just the information that may have been in the banner ad but also an enhanced version of the banner ad, containing more information and making it easier to act on or transact within the ad. The thumbnail versions can be static images, audio clips or video clips, or interactive rich media using technology such as Macromedia Flash or Enliven that provide facilities for user interaction or transaction within animated images.

Alternatively, within a particular website or within a network of websites, a user can agree ahead of time to receive enhanced versions of banner ads transparently (based on user profiling or other ad targeting methods) that would be available for later review.

The disclosed system provides electronic ad delivery that benefits the advertiser, the content publisher, and the user. The advertiser gets focused attention by users and gains a new advertising channel, the content publisher keeps users longer within its site, and users are rewarded for their attention and need not interrupt their current activity and also do not lose the chance to follow up on, an ad that might be of possible interest. Instead of being distracted by banner ads or just ignoring them (as shown by a typical 1% click-through rate for banner ads), users can gain control over ads they see and hear.

In typical known current electronic advertisement systems, even if a user is interested in a particular banner ad, s/he often skips it to avoid interrupting the current search or other activity by being immediately sent to an advertiser's site. On the other hand, there may not be a guaranteed way to return to a web page in search for a particular ad that was delivered earlier, as banner ads typically rotate. Thus, a user seeing a banner ad of possible interest may face the Hobson's choice of unwanted interruptions or possibly never again finding the ad of interest. By allowing users to "clip" (or redirect) banners and processing the user input as disclosed below, or by having enhanced versions of banner ads delivered transparently behind the scenes, the new system allows users to focus on their search for information or other current activity and then, at a later time they pick, review not only the banner ads themselves but also thumbnail collections of enhanced versions of those ads, with the opportunity to conveniently browse through the collection of various versions of stored ads and sort and rearrange the enhanced ads for review and action. In some ways, this can provide the user with the type of information that an organized and even annotated group of print catalogs might provide, but the disclosed system achieves it in a much more convenient and effective way and provides additional information as well.

Users may want to return to the storage area often because the ads may contain special limited time offers and discounts. In some cases these ads could be custom-created exclusively for individual users. Because users will be focusing attention on ads and special offers that they have personally selected, the disclosed system is likely to encourage more online shopping and other transactions. In essence, the disclosed system transforms ads into content that users are likely to want to read, listen to, organize, and act upon.

The preferred embodiments disclosed herein: (1) embed an image and/or code or some other notation into banner ads that allow users to recognize and select ads for delivery and storage for later review and action or, alternatively, leave banner ads unchanged and transparently deliver ads for storage and later review and action; (2) transform electronic ads into enhanced ads that contain additional information, such as text, images, interactive rich media, streaming audio or video, or a special discount offer, in a larger layout space than traditional banner ads; (3) deliver enhanced ads to a dedicated network storage area, which is transparent to the user until s/he decides to review this repository (the user preferably has or will establish an account at the storage area); (4) deliver enhanced ads that have a link to another web page or other web pages for more information or to allow the user to purchase the item or otherwise respond; (5) deliver enhanced ads for items in an online auction site related to the subject of the original advertisement into the network storage area; (6) deliver real-time notification of the bid status of multiple items in multiple auctions based on a cooperative tagging of items with participating auction sites into the network storage area; (7) index these enhanced electronic ads and allow users to browse, search, sort, and create sub-groups across these ads within the network storage area; (8) provide that each enhanced ad has an expiration date pre-set by the advertiser or its agent or the operator of the network storage area, and would be automatically deleted from the storage area upon expiration; and (9) allow the option that depending on the advertised product and the advertiser'some enhanced ads can be downloaded and printed for use as a coupon at participating retailers. Other ads may include a voice response trigger that calls customer service representatives to order the product by phone. Particular embodiments may include only some of these features.

BRIEF DESCRIPTION OF THE DRAWING

FIG. 1-2 is a block diagram illustrating a framework for another preferred embodiment.

FIGS. 2-1, 2-2, and 2-3 illustrate samples of types of ads used in the process of FIGS. 1-1 and 1-2.

FIGS. 3-1 and 3-2 illustrate samples of thumbnail versions of enhanced ads used in the process of FIGS. 1-1 and 1-2.

FIGS. 4-1, 4-2, and 4-3 illustrate sample screen shots used in the process of FIGS. 1-1 and 1-2.

FIGS. 5-1 and 5-2 illustrate samples of other screen shots.

DETAILED DESCRIPTION OF PREFERRED EMBODIMENTS

Figure 1:
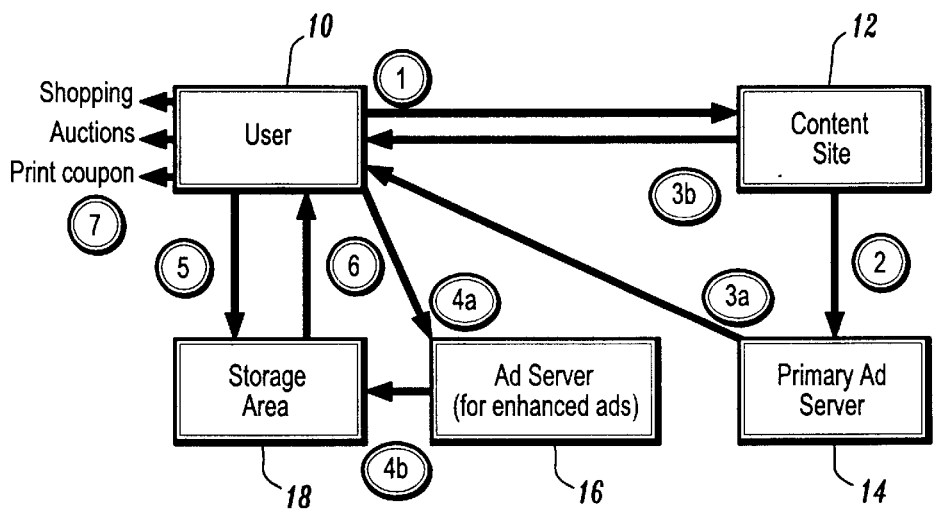
FIG. 1-1 is a block diagram illustrating a framework for a preferred embodiment.

Referring to FIG. 1-1, a user 10 is using Internet-enabled equipment such as a personal computer with an Internet browser such as Microsoft Internet Explorer or AOL Netscape Navigator, and is accessing a network such as the Internet through a suitable connection such as a dial-up modem, or a cable or DSL or wireless connection, or some other connection. User 10 visits a web content site 12, for example by entering URL information or by clicking on a hyperlink, as indicated by arrow 1 in FIG. 1. In response, content site 12 sends an initial part of a web page to user 10 for display at the user's network point of access interface such as a screen, as also indicated by arrow 1. Substantially concurrently, and still in response to user 10 visiting the site, content site 12 sends an HTML tag within the web page, or some other ad identification code, to primary ad server 14 to request an ad such as a banner ad, as indicated by arrow 2. Primary ad server 14 can be part of or associated with content site 12 or can be a third party ad server. In response to the HTML tag or other ad ID, primary ad server 14 delivers, eg:, via HTTP or other networking protocols, an ad to the user's point of access, such as a banner ad, as indicated by arrow 3a. The ad as displayed has a special part on which user 10 can click or otherwise select the ad for later use. This special part can be, for example, a special image and/or embedded code in or at the banner ad. The rest of the ad can respond to a click as typical banner ads do currently, transferring the user's screen view to another site, typically the advertiser's. Content site 12 delivers any remaining portion of the web page for display at the user's screen, as indicated by arrow 3b. If user 10 does not click on the banner ad at all, or if s/he clicks on a part of the ad that is not the special part, there is no change in the current way of using web pages and banner ads. However, if user 10 clicks on the special part of the displayed banner ad, or otherwise designates the ad for later use, the equipment at the site of user 10 sends a notification to that effect to an ad server 16 that stores enhanced versions of ads and related information, as indicated by arrow 4a. It is assumed in this discussion that ad server 16 stores an enhanced version of the ad selected by user 10 for later use, and related information concerning the ad. In response to receiving information that user 10 has selected a particular ad, ad server 16 sends an enhanced version of the ad to a storage area 18, as indicated by arrow 4b. Preferably at least one of ad server 16 and storage area 18 sends a confirmation message to user 10 that the enhanced version of the ad is being sent to or has been received at storage area 18. At a later time, user 10 can go to storage 18 area via the Internet connection for access to previously selected ads, as indicated by arrow 5. In response to such a request, storage server 18 supplies user 10 with information such as thumbnail versions of enhanced ads previously selected by, user 10, as indicated by arrow 6. User 10 can select one or more of the enhanced ads for review, which storage area 18 delivers as needed, as also indicated by arrows 5 and 6. From the enhanced ads displayed, user 10 can choose to purchase goods or services, enter an on-line auction bid, print a coupon, listen to an audio clip, or take some other action through hyperlinks or otherwise.

Figures 1, 2:
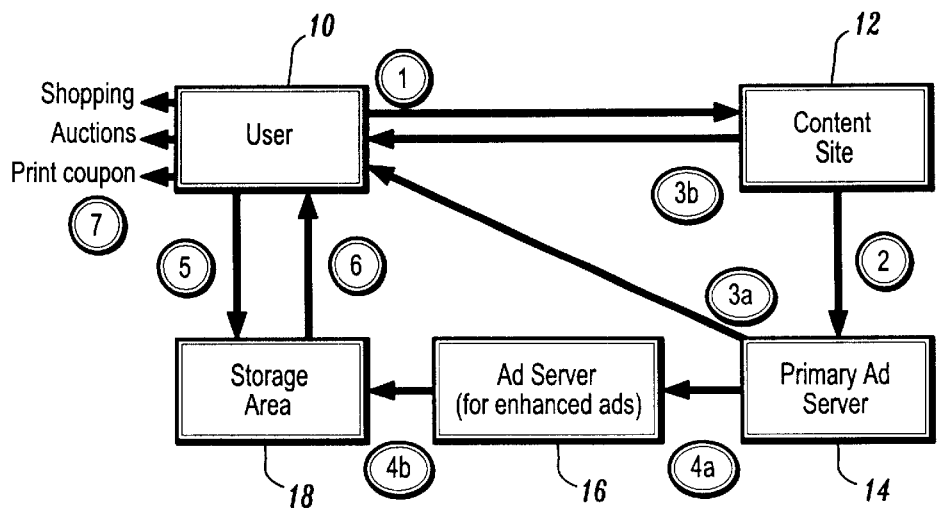

FIG. 1-2 illustrates another preferred embodiment, which is otherwise the same as the preferred embodiment of FIG. 1-1 except that the original banner ads at content site 12 do not contain a special part for signaling user action, and that the delivery of enhanced versions of banner ads to the user's storage area 18 by the ad server 16 is triggered automatically by the action of the primary ad server 14 without any user intervention such as indicated by arrows 4a and 4b in FIG. 1-1.

Several different embodiments of using these two approaches are described below, but first there is a description of examples of various forms that ads, thumbnail representations and enhanced ads can take.

FIG. 2-1 illustrates a sample banner ad 20, typically 468×60 pixels currently, delivered to user 10 from content site 12. The special part of banner ad 20 can be an image or other notation within ad 20, such as the words "store for later," or can be a symbol or other words serving a similar purpose, or it can be simply a designated area of the banner ad, such as the right-hand margin of ad 20, or a shaded or otherwise designated part of the ad. Alternatively, the special part can be outside the confines of ad 20.

FIG. 2-2 illustrates a sample of a thumbnail version 22 of an enhanced ad, delivered to user 10 from storage area 18. This version currently is typically 220×180 pixels, so the additional space can be used to provide more information than in a typical banner ad.

Figures 1, 2:
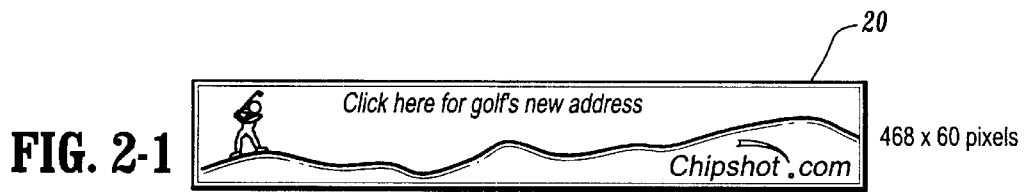
Figure 2:
Figures 2, 3:
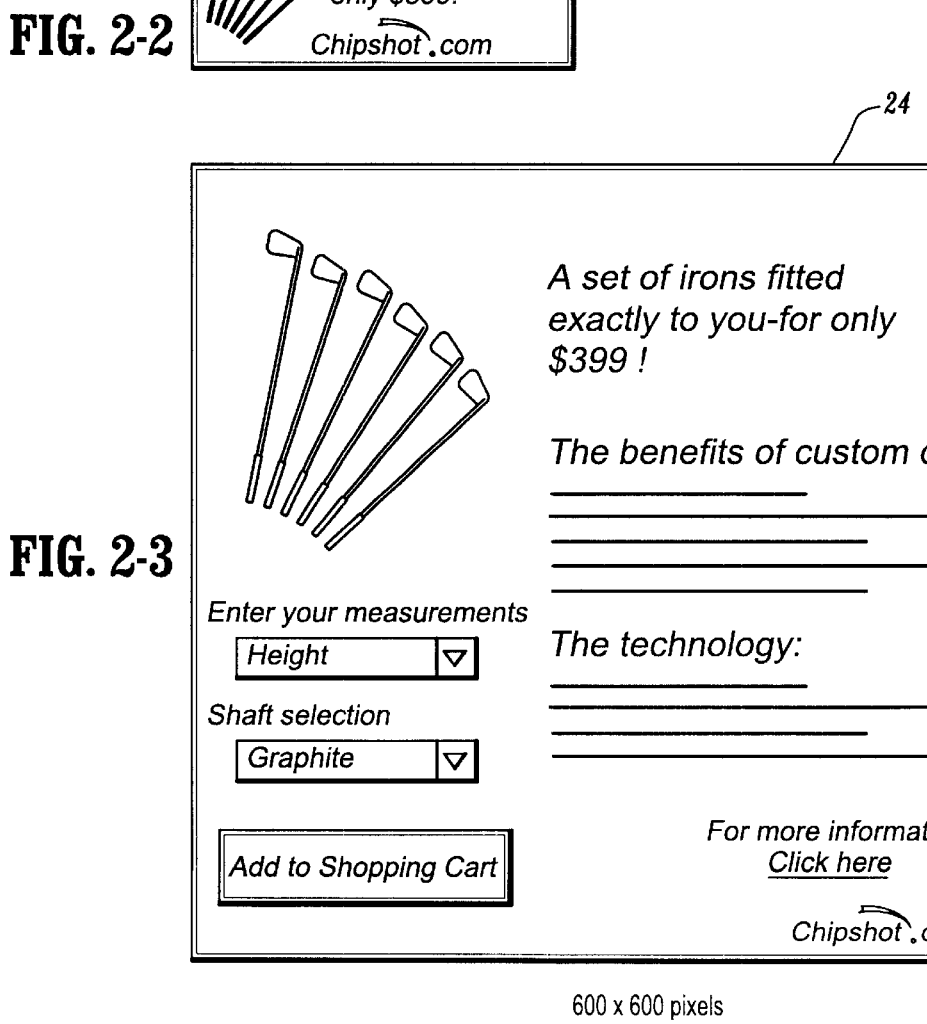
Figures 1, 3:
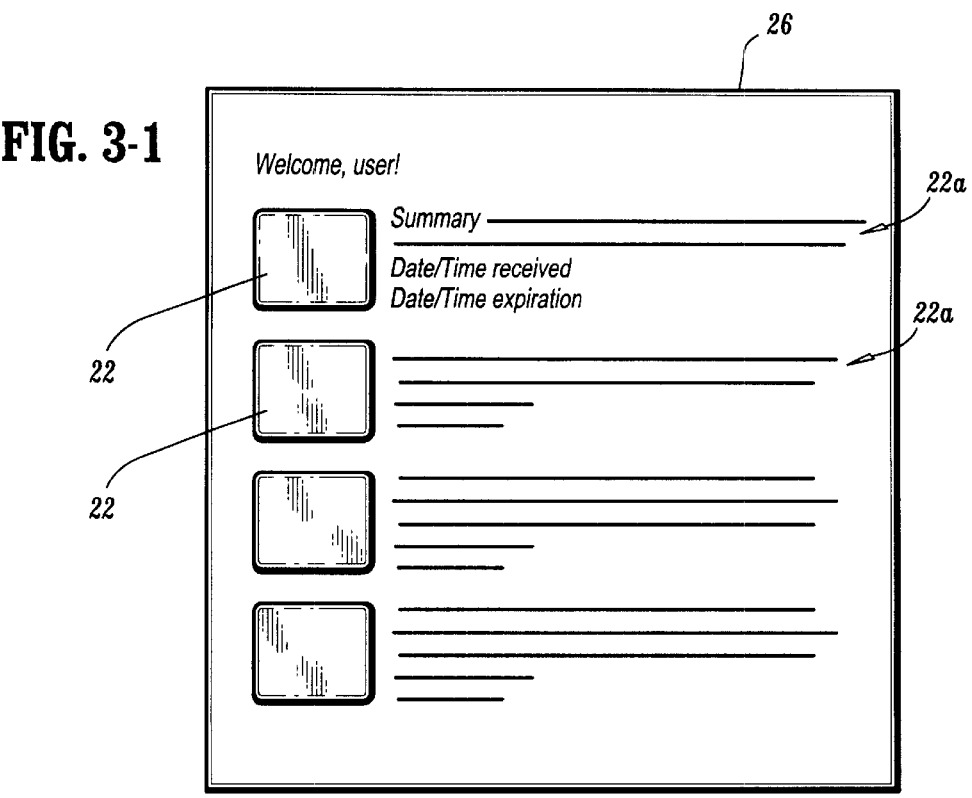
Figures 2, 3:
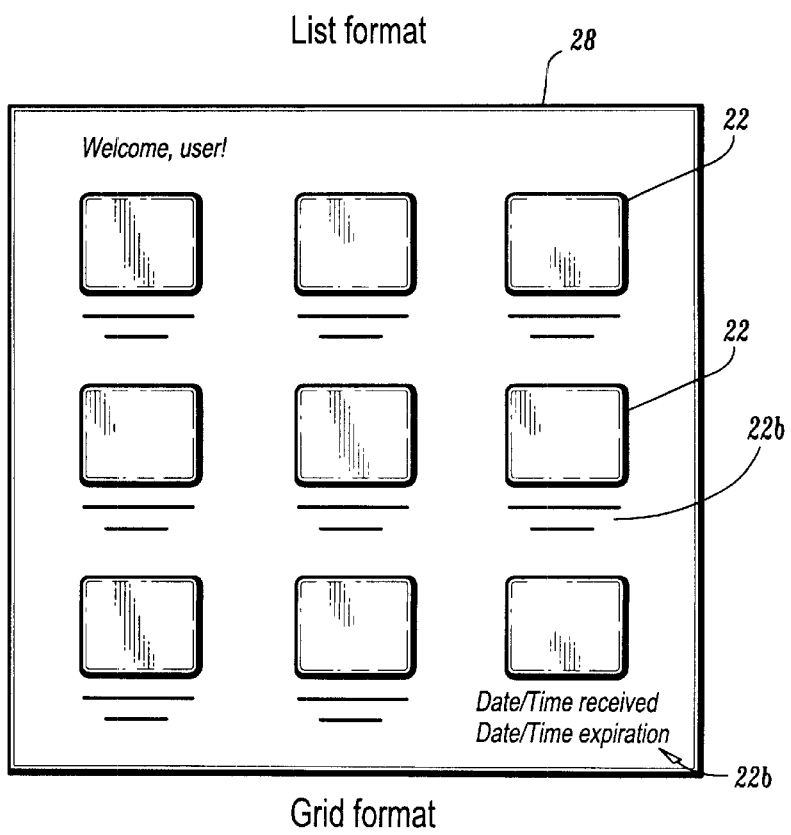

FIG. 2-3 illustrates an enhanced ad 24, currently typically at 600×600 pixels, although it can be larger. Enhanced ad 24 can be an HTML page, as illustrated, or it can contain a rich media ad with animation, audio, and/or video. Enhanced ad 24 can allow user 10 to purchase an item, enter an auction bid, print a special coupon for use at a participating retailer, or take some other action, typically by clicking on indicated parts of enhanced ad 24, or for more limited Internet-enabled devices, using some other trigger like a voice response.

FIG. 3-1 illustrates one form of a set 26 of thumbnail versions 22 of enhanced ads 24. In this format, thumbnails versions 22 are in a list presentation, preferably with additional explanatory language 22a adjacent to at least some of the thumbnail versions 22

FIG. 3-2 illustrates another form of a set of thumbnail versions 22 a grid 28. Preferably, at least some of thumbnail versions in set 28 have associated text 22b.

FIG. 4-1 illustrates a sample screen viewed by user 10 when using preferred embodiments of the system disclosed herein. The screen shows a Lifestreams interface 30 in the form of a pull-down menu. User 10 can click on the designation Shopping Stream in the menu to thereby send a signal to storage area 18 which, in response, sends a stream of thumbnails 22 of the enhanced versions 24 of the ads previously stored in storage area 18. Within this storage area, users can browse, search, sort, and create sub-groups across the indexed ads. One example of such operations is implemented within Lifestreams technology, which is commercially available from the assignee hereof, Mirror Worlds Technologies, Inc. of New Haven, Conn., and aspects thereof are described in U.S. Pat. No. 6,006,227, which is hereby incorporated by reference.

FIG. 4-2 illustrates a preferred display 32 of thumbnail versions 22 in a visual stream, in the order in which the user selected banner ads, and with the most recently selected ad in front and the other ads receding chronologically or in another user designated order toward the back. By moving the cursor with the mouse over or otherwise activating thumbnail versions 22 in display 32, user 10 makes the currently pointed to thumbnail 22' appear in an enlarged form on the screen, for a dynamic "glance preview" at the thumbnail versions 22. Although the drawing illustrates a static image, the thumbnail can be rich media such as a video or audio clip.

FIG. 4-3 illustrates a sample display or screen shot 34 of an enhanced ad 24, which user 10 can reach by clicking on or otherwise designating one of the thumbnails 22 in the display of FIG. 4-2. As earlier noted, user 10 can take the appropriate action upon viewing an enhanced ad such as 34 in FIG. 4-3, including clicking on a link to an advertiser or a seller, listening to an audio clip, or triggering a video clip display.

Figures 1, 2, 5:
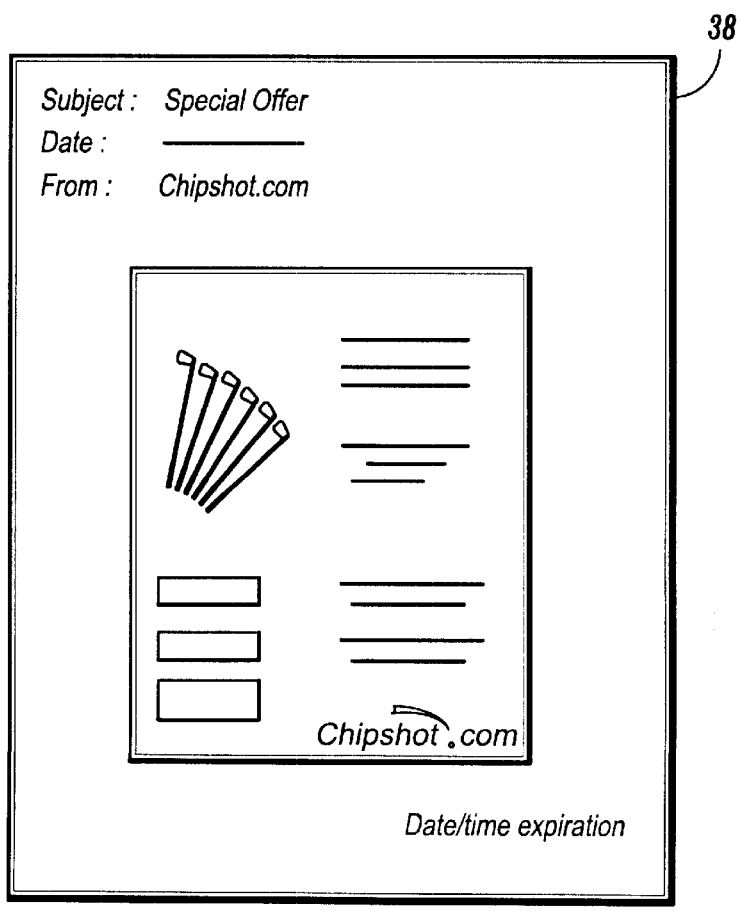

FIG. 5-1 illustrates an example of a mail server inbox 36 for a user 10, for an embodiment in which storage area 18 can act as a mail server receiving via e-mail enhanced versions (and other information) for ads user 10 has selected for possible later viewing. In this example, inbox 36 as displayed for user 10 shows a list of the ads the user has selected by clicking on the special areas of ads in web pages. The communication to user 10 can be via HTML-enabled mail. This example of a display 36 includes the subject of the ad, the identity of the advertiser, and some data (e.g., the date user 10 selected this ad).

FIG. 5-2 illustrates an example of an e-mail message 38 user 10 would display in response to clicking on or otherwise activating one of the e-mail messages in display 36. In essence, the e-mail message is an enhanced version of the ad user 10 has selected at some earlier time.

Figure 6:
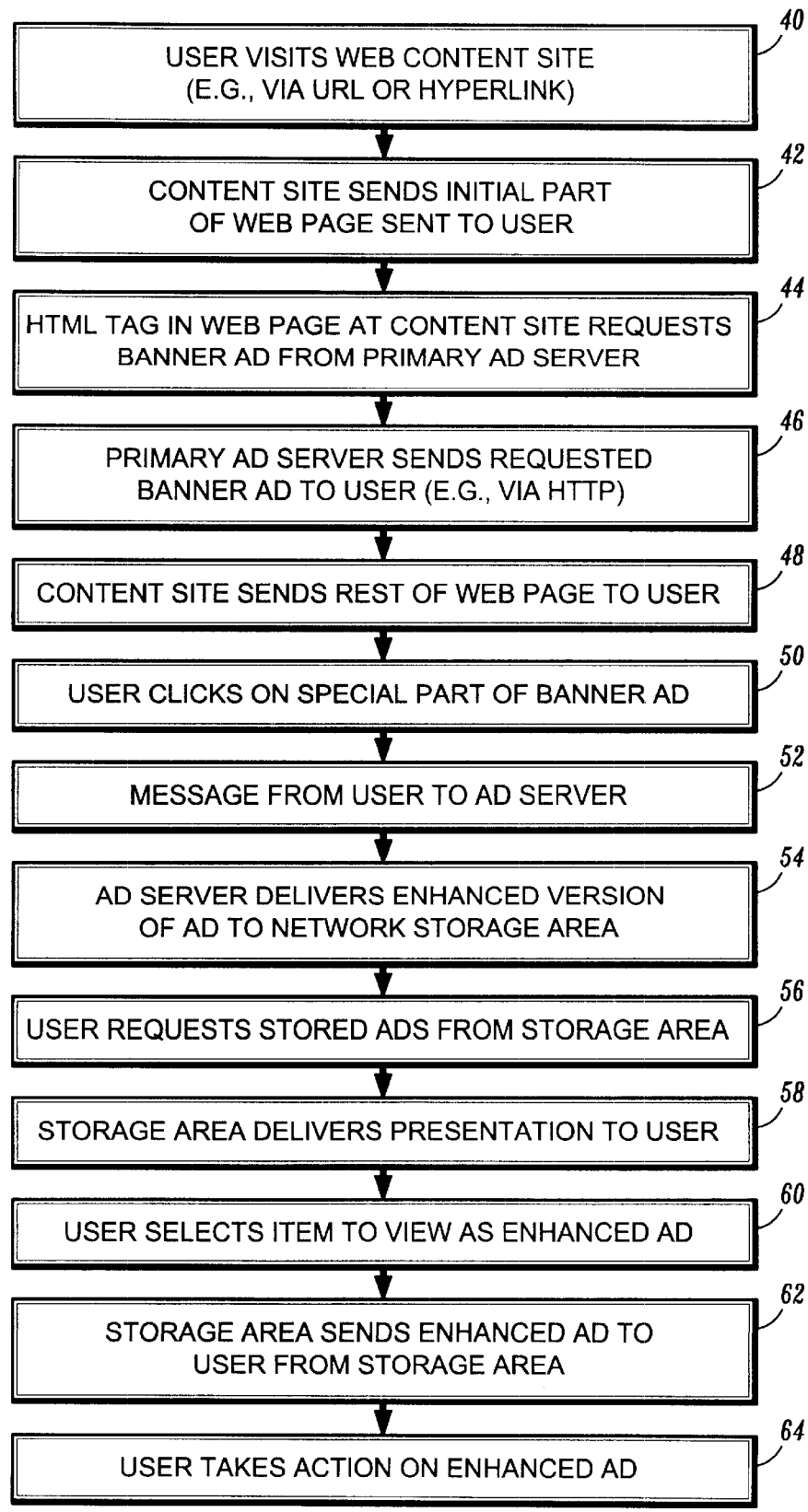
FIG. 6 is a flowchart illustrating steps carried out in a preferred embodiment.

FIG. 6 is a flowchart illustrating main steps of processes in several embodiments of the disclosed system, practiced in a system such as illustrated in FIG. 1-1. At step 40 of FIG. 6, the user visits a web content site, for example as currently done with commercially available browsers. At step 42, the content site responds to this access by the user by sending an initial part of the web page the user has requested. At step 44, the content site requests the primary ad server to send an ad to the user, which the primary add server does at step 46. At step 48, the content site sends the rest of the web page to the user. The events of steps 42 through 48 take place substantially concurrently, and the system could be modified to send the entire web page to the user without interruption and send a request for a banner ad separately to the primary ad server.

If the user either has no interest in the displayed ad or has sufficient interest to want to be switched to the advertiser's site, the user actions and results are no different from current Internet practice—if the user does not click anywhere on the ad, the ad can remain displayed for some time and then change to another ad but, if the user clicks on a part of the ad other than the special part, s/he is sent to another site, typically the advertiser's site.

If the user has a possible interest in an ad but does not want to interrupt the current activity, and yet wants to retain the option to review that ad later, the user at step 50 clicks on the special part of the displayed ad or otherwise designates the ad for possible later use. This user action sends a message to that effect at step 54 to the ad server. In response, at step 54 the ad server delivers to the storage area an enhanced version of the ad the user has just designated for possible later use, and may also deliver a thumbnail version of the enhanced version of the ad as well as other information associated with the ad the user selected.

If at a later time the user would like to review and possibly make some other use of previously designated ads, the user at step 56 sends a request for those ads to the storage area. This can take several forms. For example, the user can establish an account with the storage area and receive a password or some other way to access the ads this particular user has designated. As another possibility, the user can employ e-mail procedures to access information regarding previously designated ads. In the case of audio ads, the user can employ a voice response mechanism to review audio clips via the Internet-enabled device of choice, such as a digital wireless phone.

At step 58, the storage area (or a mail server) delivers to the user a presentation related to the ads the user has designated over some period of time. One form of this presentation is thumbnail versions of enhanced versions of the ads, such as thumbnail version 22 in FIG. 2-2. The presentation can be in a list form as in FIG. 3-1, in a grid form as in FIG. 3-2, in a Lifestream form as in FIG. 4-2, or in some other convenient form. In the case of using e-mail protocol, the presentation can be as in FIG. 5-1. In each case, the presentation is displayed for the user and made available for discrete review at a convenient time.

At step 60, the user reviews the presentation. The user can scroll through the displayed thumbnail versions in presentations such as in FIGS. 3-1 and 3-2, or move through the stream in a presentation such as in FIG. 4-2, or scroll through the e-mail versions in a presentation such as in FIG. 5-1. In the process of reviewing the presentations, the user can sort the displayed items by the time they were designated, or by date of the ads, or by expiration date or any offers, or by other criteria. These operations can be performed using the techniques of the Lifestreams technology earlier identified. If the user has a further interest in a particular ad and designates it, such as by clicking on the thumbnail version, this sends a request for the enhanced version of the ad to the storage area (or the mail server). The case of a mail-server embodiment, clicking on or otherwise selecting the thumbnail version may open the message that can be the enhanced version of the ad, or in the audio version the audio clip may expand to an entire message, in the video version a video clip may expand to a full commercial, and so on.

In response, at step 62 the storage area (or the mail server) sends the enhanced version of the ad for display at the user's screen. The enhanced version of the ad can be in the form illustrated in any one of FIGS. 2-3, 3-2, 4-3, and 5-2.

At step 64 the user takes action on the displayed enhanced ad, such as printing a coupon that might be a part of the enhanced version of the ad, entering an auction, clicking on a hyperlink in the enhanced ad version for access to the advertiser's site, deleting the ad, connecting via a toll-free number voice response menu to an audible hyperlink, or returning to the thumbnail presentation, or taking some other action.

Figure 7:
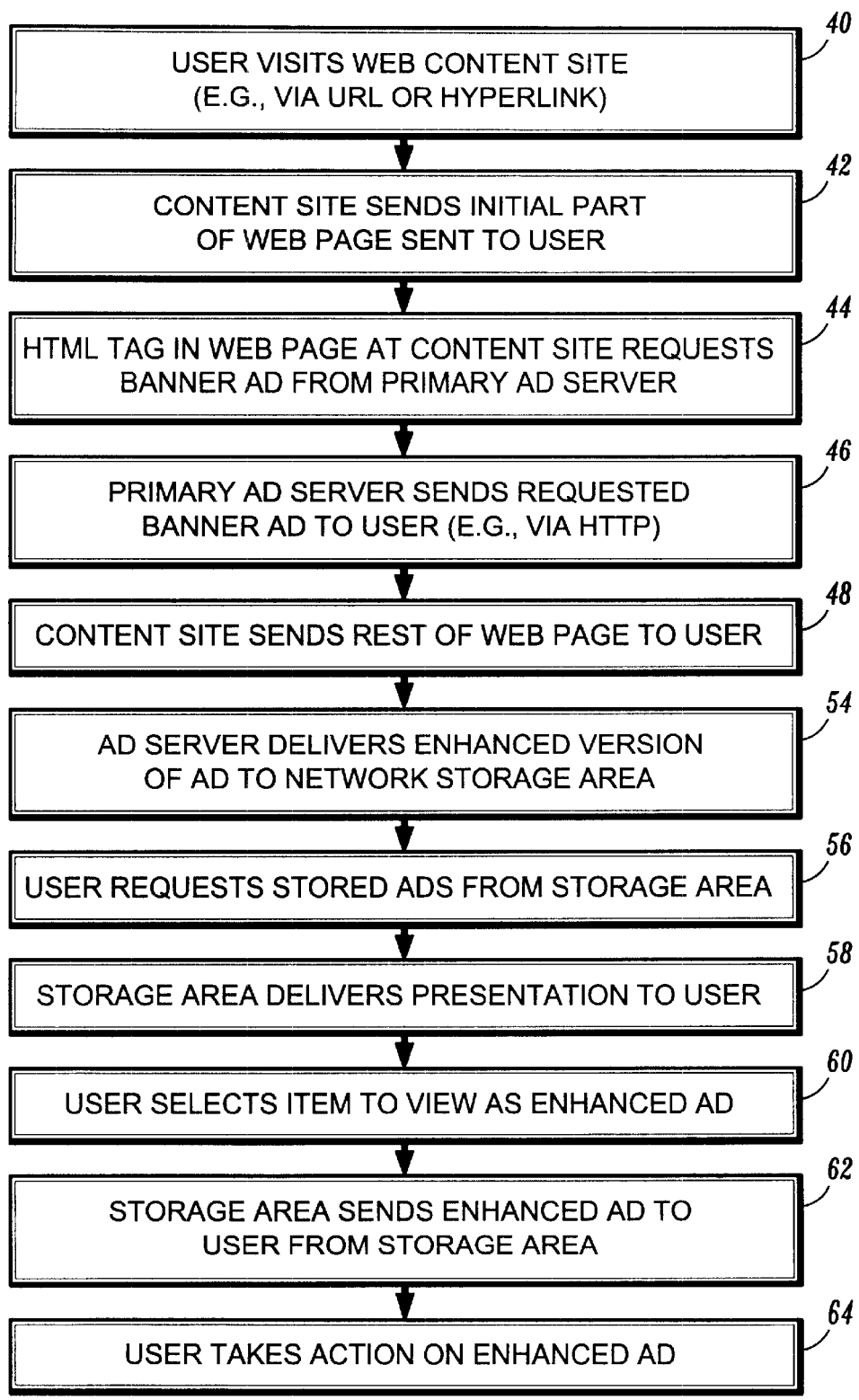
FIG. 7 is a flowchart illustrating steps carried out in another preferred embodiment.

FIG. 7 is a flowchart illustrating main steps of processes used in other embodiments of the disclosed system as illustrated in FIG. 1-2. It is identical to the flowchart in FIG. 6 except that steps 50 and 52 are omitted. In step 54, primary ad server 14 communicates with ad server 16 to coordinate the proper delivery of the enhanced version of the ad to the user's network storage area in storage area 18.

One embodiment of the system can use its own web site, with private accounts dedicated to each individual user, as the storage area. The user can enter a specific URL or follow a link to the storage area, enter in authentication information, and then be able to browse or otherwise review the collection of thumbnails and enhanced ads that are contained in the storage area. The ad server can hold the inventory of enhanced ads and deliver both thumbnail and full versions of enhanced ads via HTTP or other networking protocols to the user's Internet storage area upon the user clicking on or otherwise activating the special image in the banner. The ad server can recognize the banner ad and the user (via an identification code, such as a cookie placed in the user's web browser) in order to deliver the correct enhanced ad to the correct user's account at the storage area that receivers, stores, and indexes enhanced ads from the ad server and comprises a dedicated network server space for each user.

As an example, at a portal site a user issues a search for "golf". In response, a golf-related banner ad, with the special part (image and/or code), is delivered to the web page of search results. The user can click on or otherwise activate the special part of the ad and an enhanced version of the banner is delivered to the Internet ad storage area of the portal (as long as the user is registered with an account). The user could see an optional confirmation message for the delivery of the enhanced ad, but would otherwise be unaware of any other action behind the scenes. If the user accesses the storage area, s/he would then see first a thumbnail preview and summary of the enhanced ad and then by mouse clicking on or otherwise activating the thumbnail, would see the full enhanced banner ad. After the user "clips" one or, more typically, several ads from his/her travel through many web sites in search of information or products, s/he could return to the storage area to find multiple enhanced banners (displayed initially by their thumbnail previews). The user could review all the ads, search for particular types of products, and set up groups tied to particular types of products as in a customized catalog. If the user is interested in purchasing the item advertised, then s/he could activate the link in the ad either physically or verbally and go directly to the online retailer's page or a live phone connection to customer service for that product and complete the transaction.

In another embodiment, the storage area can be a component service of an independent web portal for registered users. After logging on to the portal, a user would be able to follow a link to the storage area and review his/her collection of enhanced ads that have followed his/her trail of web surfing. Once at the storage area of the portal, the viewing, listening to, and navigation of the enhanced ads would operate as earlier described.

In another embodiment, the storage area is created as a "stream" implemented within the Lifestreams system as earlier described. The enhanced ads in the stream display information in three stages: (1) a thumbnail image of an ad and basic descriptive information is presented in the default stream view; (2) a dynamic "glance preview" with a larger image and summary descriptive information is presented when the user mouses over the ad in the stream view; and (3) a full ad, such as a full page ad, is presented when the user double-clicks on or otherwise activates the ad in the stream view.

Users can also search within the stream, (called, e.g., a "Shopping Stream") and save the results of a query (called, e.g., a "substream") for future review. These substreams are persistent and are updated with relevant content when the user returns to view the substream via a hyperlink or pull-down menu. In addition, users can manually "clip" individual ads from the stream into a specific substream (e.g., named "My Shopping") for future review and comparison.

In another embodiment, an e-mail system is used for the storage of enhanced ads. An enhanced ad could be e-mailed to the user as s/he encounters each parent banner ad. The storage area would be the user's e-mail inbox, and the user could search, sort, and organize the enhanced ads using the tools in his or her e-mail client, HTML-mail web service, or Internet-enabled device.

Although the system is described by reference to particular embodiments, many changes and modifications may become apparent to those skilled in the art without departing from the spirit and scope of the invention defined by the appended claims.

I claim:

1. A process comprising:
   presenting a network user with user requested content as well as ads;
   in response to user designation of ads for possible later use, storing enhanced versions of the ads in a user-associated area of a server;
   in response to a user request for previously designated ads, delivering to the user a visual and/or audio display presentation of thumbnail versions of the enhanced versions of the ads; and in response to a user selection of an ad from the visual and/or audio display presentation of thumbnail versions, delivering to the user a visual and/or audio display of the stored enhanced version of the ad for action thereon by the user.

2. A process as in claim 1 in which the thumbnail versions of the enhanced ads comprise static images.

3. A process as in claim 1 in which the thumbnail versions of the enhanced ads comprise interactive rich media.

4. A process as in claim 1 in which the thumbnail versions of the enhanced ads comprise audio clips.

5. A process as in claim 1 in which the thumbnail versions of the enhanced ads comprise video clips.

6. A process as in claim 1 in which the enhanced ads comprise static images.

7. A process as in claim 1 in which the enhanced ads comprise interactive rich media.

8. A process as in claim 1 in which the enhanced ads comprise audio clips.

9. A process as in claim 1 in which the enhanced ads comprise video clips.

10. A process as in claim 1 in which the presentation of thumbnail versions of the enhanced ads conforms to a Lifestream display formatting the displayed thumbnail versions as partly overlapping, chronologically or otherwise selectively arranged images.

11. A process as in claim 1 in which the storing in a user-associated area of a server comprises storing in one or more user areas of one or more storage facilities of a network.

12. A process as in claim 1 including enabling the user to browse, listen to, search, sort, and create sub-groups across the ads related to said thumbnail versions displayed for the user.

* * * * *